(12) United States Patent
Dutch et al.

(10) Patent No.: US 10,839,402 B1
(45) Date of Patent: Nov. 17, 2020

(54) LICENSING MODEL FOR TIERED RESALE

(71) Applicant: EMC IP Holding Company LLC, Hopkinton, MA (US)

(72) Inventors: Michael John Dutch, Saratoga, CA (US); Christopher Hercules Claudatos, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 746 days.

(21) Appl. No.: 14/223,265

(22) Filed: Mar. 24, 2014

(51) Int. Cl.
*G06F 21/12* (2013.01)
*G06Q 30/00* (2012.01)
*G06F 21/10* (2013.01)
*G06F 21/44* (2013.01)
*H04L 29/06* (2006.01)

(52) U.S. Cl.
CPC ......... *G06Q 30/0185* (2013.01); *G06F 21/10* (2013.01); *G06F 21/12* (2013.01); *G06F 21/44* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 4,250,550 A | 2/1981 | Fleischer | |
| 4,937,863 A * | 6/1990 | Robert | G06F 21/105 705/59 |
| 5,014,234 A * | 5/1991 | Edwards, Jr. | G06F 21/121 705/51 |
| 5,023,907 A * | 6/1991 | Johnson | G06F 21/105 710/200 |
| 5,386,369 A * | 1/1995 | Christiano | G06F 21/123 705/400 |
| 5,689,233 A | 11/1997 | Kurisu et al. | |
| 5,864,620 A * | 1/1999 | Pettitt | G06F 21/10 705/320 |
| 5,995,092 A | 11/1999 | Yuen | |
| 6,009,401 A * | 12/1999 | Horstmann | G06F 21/10 705/317 |
| 6,009,525 A * | 12/1999 | Horstmann | G06F 21/10 705/54 |
| 6,044,469 A * | 3/2000 | Horstmann | G06Q 99/00 705/51 |
| 6,163,738 A | 12/2000 | Miller | |
| 6,191,695 B1 | 2/2001 | Tatsuno | |
| 6,289,452 B1 * | 9/2001 | Arnold | G06F 21/10 705/51 |
| 6,519,571 B1 | 2/2003 | Guheen et al. | |
| 6,629,081 B1 | 9/2003 | Cornelius et al. | |
| 6,651,706 B2 | 11/2003 | Litt | |
| 6,948,070 B1 | 9/2005 | Ginter | |
| 7,095,854 B1 | 8/2006 | Ginter et al. | |
| 7,133,846 B1 | 11/2006 | Ginter et al. | |
| 7,762,470 B2 | 7/2010 | Finn et al. | |

(Continued)

*Primary Examiner* — Jan P Mincarelli
(74) *Attorney, Agent, or Firm* — Van Pelt, Yi & James LLP (57) ABSTRACT

A method, process, and system for multi-tier resale is discussed here. Acceptance proxies may be distributed to downstream resellers and customers. The acceptance proxies may be registered with a producer who provides a service. The acceptance proxies may be registers directly, or anonymously. Escrow services may ensure each party has fulfilled its contractual obligations before access to the service is granted.

28 Claims, 8 Drawing Sheets

(56) References Cited

U.S. PATENT DOCUMENTS

| | | | |
|---|---|---|---|
| 7,849,018 B1* | 12/2010 | Warner | G06F 21/10 380/200 |
| 8,135,413 B2 | 3/2012 | Dupray | |
| 8,296,733 B2 | 10/2012 | Phillips et al. | |
| 8,667,382 B2 | 3/2014 | Martin, Jr. | |
| 8,725,700 B2 | 5/2014 | Rappaport | |
| 2002/0104071 A1 | 8/2002 | Charisius et al. | |
| 2002/0116257 A1 | 8/2002 | Helbig | |
| 2002/0138441 A1* | 9/2002 | Lopatic | G06F 21/125 705/59 |
| 2002/0198629 A1 | 12/2002 | Ellis | |
| 2003/0009423 A1* | 1/2003 | Wang | G06Q 20/123 705/51 |
| 2003/0046244 A1 | 3/2003 | Shear et al. | |
| 2003/0182563 A1* | 9/2003 | Liu | G06F 21/10 713/191 |
| 2003/0187794 A1 | 10/2003 | Irwin et al. | |
| 2003/0220880 A1* | 11/2003 | Lao | G06F 21/10 705/51 |
| 2004/0025058 A1* | 2/2004 | Kuriya | G06F 21/10 726/29 |
| 2004/0039916 A1* | 2/2004 | Aldis | G06F 21/10 713/177 |
| 2004/0133488 A1 | 7/2004 | Daidone et al. | |
| 2004/0186785 A1 | 9/2004 | Basil et al. | |
| 2004/0193545 A1* | 9/2004 | Shlasky | G06F 21/125 705/59 |
| 2005/0050315 A1* | 3/2005 | Burkhardt | G06F 21/123 713/150 |
| 2005/0076334 A1* | 4/2005 | Demeyer | G06F 21/10 717/177 |
| 2005/0137984 A1* | 6/2005 | Nguyen | G06Q 20/123 705/51 |
| 2005/0149458 A1 | 7/2005 | Elgen et al. | |
| 2006/0178918 A1 | 8/2006 | Mikurak | |
| 2006/0212364 A1* | 9/2006 | Lawe | G06Q 10/063 705/7.11 |
| 2007/0033273 A1 | 2/2007 | White et al. | |
| 2007/0043608 A1 | 2/2007 | May et al. | |
| 2007/0100762 A1 | 5/2007 | Luo et al. | |
| 2008/0126271 A1 | 5/2008 | Zanlongo | |
| 2008/0172309 A1 | 7/2008 | Reimer | |
| 2008/0272934 A1 | 11/2008 | Wang et al. | |
| 2008/0281915 A1 | 11/2008 | Elad et al. | |
| 2009/0031286 A1 | 1/2009 | Yee et al. | |
| 2009/0055252 A1* | 2/2009 | Samuel | G06Q 30/0264 705/14.61 |
| 2009/0271342 A1 | 10/2009 | Eder | |
| 2010/0076835 A1 | 3/2010 | Silverman | |
| 2010/0091964 A1 | 4/2010 | Daidone et al. | |
| 2010/0205152 A1 | 8/2010 | Ansari | |
| 2010/0274727 A1* | 10/2010 | Peterson | G06Q 30/00 705/80 |
| 2011/0010304 A1 | 1/2011 | Chan Wong et al. | |
| 2011/0093371 A1* | 4/2011 | Clemm | G06Q 30/0207 705/34 |
| 2011/0202443 A1 | 8/2011 | Martin | |
| 2011/0295722 A1 | 12/2011 | Reisman | |
| 2012/0005050 A1 | 1/2012 | Boldyrev et al. | |
| 2012/0127509 A1* | 5/2012 | Faber | G06F 3/1218 358/1.14 |
| 2012/0155296 A1 | 6/2012 | Kashanian | |
| 2012/0155478 A1 | 6/2012 | Lake et al. | |
| 2012/0197722 A1 | 8/2012 | Mesaros | |
| 2012/0253901 A1 | 10/2012 | Montgomery et al. | |
| 2012/0290339 A1 | 11/2012 | Sussman et al. | |
| 2013/0013459 A1 | 1/2013 | Kerr et al. | |
| 2013/0091209 A1* | 4/2013 | Bennett | G06Q 50/01 709/204 |
| 2013/0326637 A1 | 12/2013 | Fang et al. | |
| 2014/0108789 A1 | 4/2014 | Phatak | |
| 2014/0129288 A1 | 5/2014 | Eager | |
| 2014/0172625 A1 | 6/2014 | Reisman | |
| 2014/0373175 A1* | 12/2014 | Kacharia | G06F 21/105 726/28 |
| 2014/0379595 A1* | 12/2014 | Slattery | G06F 21/10 705/318 |
| 2015/0058076 A1 | 2/2015 | Leff | |
| 2016/0277261 A9 | 9/2016 | Ansari | |

* cited by examiner

LICENSING MODEL FOR TIERED RESALE

CROSS REFERENCE TO RELATED APPLICATIONS

This application is related to co-pending U.S. patent application Ser. No. 13/539,434 for COMMON LICENSING OF GENERAL OFFERINGS, U.S. patent application Ser. No. 13/539,436 for CUSTOMER TARIFFS, and U.S. patent application Ser. No. 13/539,437 for PUBLIC SERVICE UNITS, which are incorporated herein by reference for all purposes.

FIELD OF THE INVENTION

This invention relates generally to technology licensing, and more particularly to systems and methods for tiered service licensing.

BACKGROUND OF THE INVENTION

Unlike hardware products, software products are easily transferred and copied. This frees software vendors from many of the distribution and inventory costs that hardware vendors have to deal with. However, this ease of distribution and copying also makes software prone to theft, also known as software piracy.

Conventional methods to combat software piracy include associating a license key with the software product. These license keys may also be referred to as "serial numbers," or "activation keys," among others. When a user enables the software product, a prompt may ask for a license key. If a correct license key is entered by the user, the desired capability may be enabled. If a correct license key is not entered, the installation may exit, or a limited-functionality version of the software may be installed. License keys allow a software vendor to withhold functions of the software until the software vendor has been compensated.

Unfortunately, conventional licensing schemes do not fully protect against software piracy. Further, conventional licensing schemes often create large administrative burdens.

There is a need, therefore, for an improved method, article of manufacture, and apparatus for licensing products.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
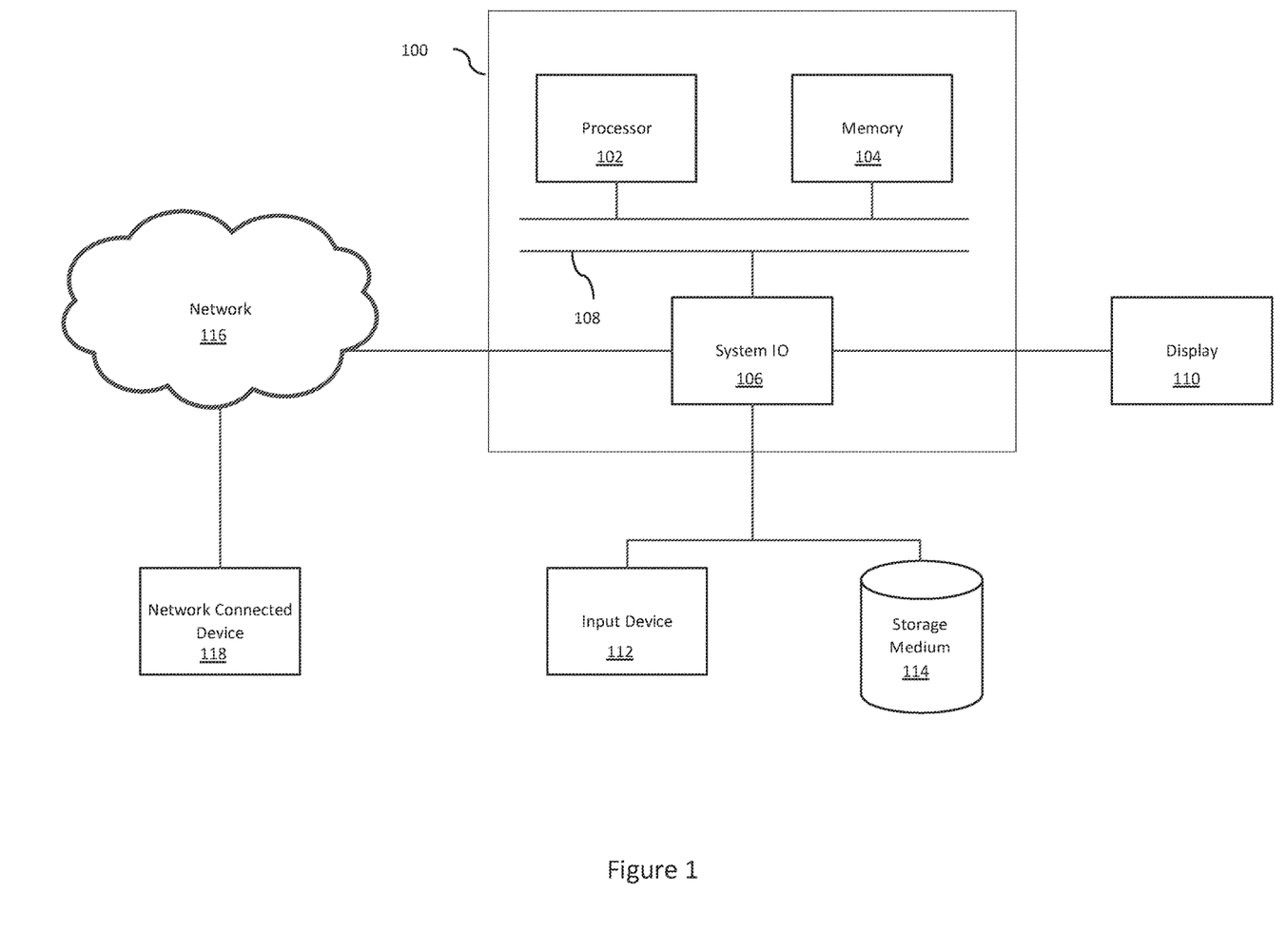
FIG. 1 illustrates a general-purpose computer consistent with an embodiment of the present disclosure.

FIG. 1 depicts a computer system consistent with an embodiment of the present disclosure. General purpose computer 100 may include processor 102, memory 104, and system IO controller 106, all of which may be in communication over system bus 108. In an embodiment, processor 102 may be a central processing unit ("CPU") or accelerated processing unit ("APU"). Some embodiments may comprise multiple processors, or a processor with multiple cores. Processor 102 and memory 104 may together execute a computer process, such as the processes described herein, using input received from IO controller 106.

System IO controller 106 may be in communication with display 110, input device 112, non-transitory computer readable storage medium 114, and/or network 116. Display 110 may be any computer display, such as a monitor, a smart phone screen, or wearable electronics and/or it may be an input device such as a touch screen. Input device 112 may be a keyboard, mouse, track-pad, camera, microphone, or the like, and storage medium 114 may comprise a hard drive, flash drive, solid state drive, magnetic tape, magnetic disk, optical disk, or any other computer readable and/or writable medium. Storage device 114 may also reside inside general purpose computer 100, rather than outside as shown in FIG. 1.

Network 116 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 116 may be either wired or wireless or any combination thereof, and may provide input to or receive output from IO controller 106. In an embodiment, network 116 may be in communication with one or more network connected devices 118, such as another general purpose computer, smart phone, PDA, storage device, tablet computer, or any other device capable of connecting to a network.

Figure 2:
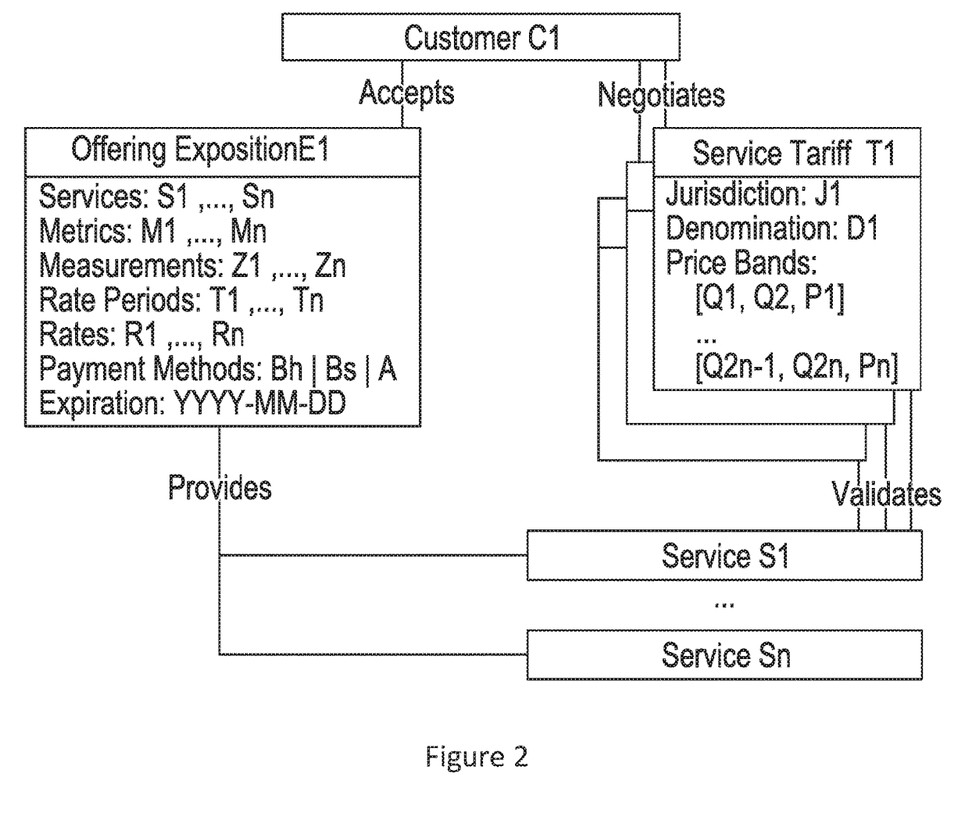
FIG. 2 illustrates an offering exposition and a tariff consistent with an embodiment of this disclosure.

FIG. 2 depicts a licensing model consistent with an embodiment of the present disclosure. The licensing model allows a producer of a software product to define an "offering exposition." This offering exposition may describe a set of services a vendor or producer can provide to a customer, and may further define baseline values associated with those services. These baseline values could be, for example, how often the provider charges for the services, acceptable payment methods, metrics used to identify how much of a given service the customer has consumed, etc.

For example, the offering exposition may describe a backup service offering. Services provided within the backup service offering could include a backup service, a recovery service, and an archive service. For the backup service, the offering exposition may further define that the customer is charged annually based on the amount of data they have backed-up. Similar baseline values may be defined for the recovery service and the archive service.

In an embodiment, the vendor or producer may offer the offering exposition to a customer on a non-negotiable basis. Negotiable elements associated with the services, in contrast, may be defined in a "service tariff." Service tariffs may be specific to each customer, and may further be associated with a specific service defined in the service offering. For example, each customer may negotiate their own tariffs for a backup service, recovery service, and archive service.

Service tariffs may include negotiable elements, such as how much each customer is charged, what locale or jurisdiction they are allowed to access the service from, what denomination/currency to use, and a set of price bands. Price bands may vary the cost of a service based on consumption. For example, a customer accessing a backup service may be charged less as they consume more. The first 10 GB, for example, may be $20, the second 10 GB may be $15, and each 10 GB increment after 20 GB may be $10.

In some embodiments, a customer may only access the services defined in the offering exposition if they have a negotiated tariff in place. The customer may be validated against the service using login credentials or some other verification mechanism.

For a detailed description of service offerings and tariffs, please see the cross-referenced applications, which are hereby incorporated by reference.

Figure 3:
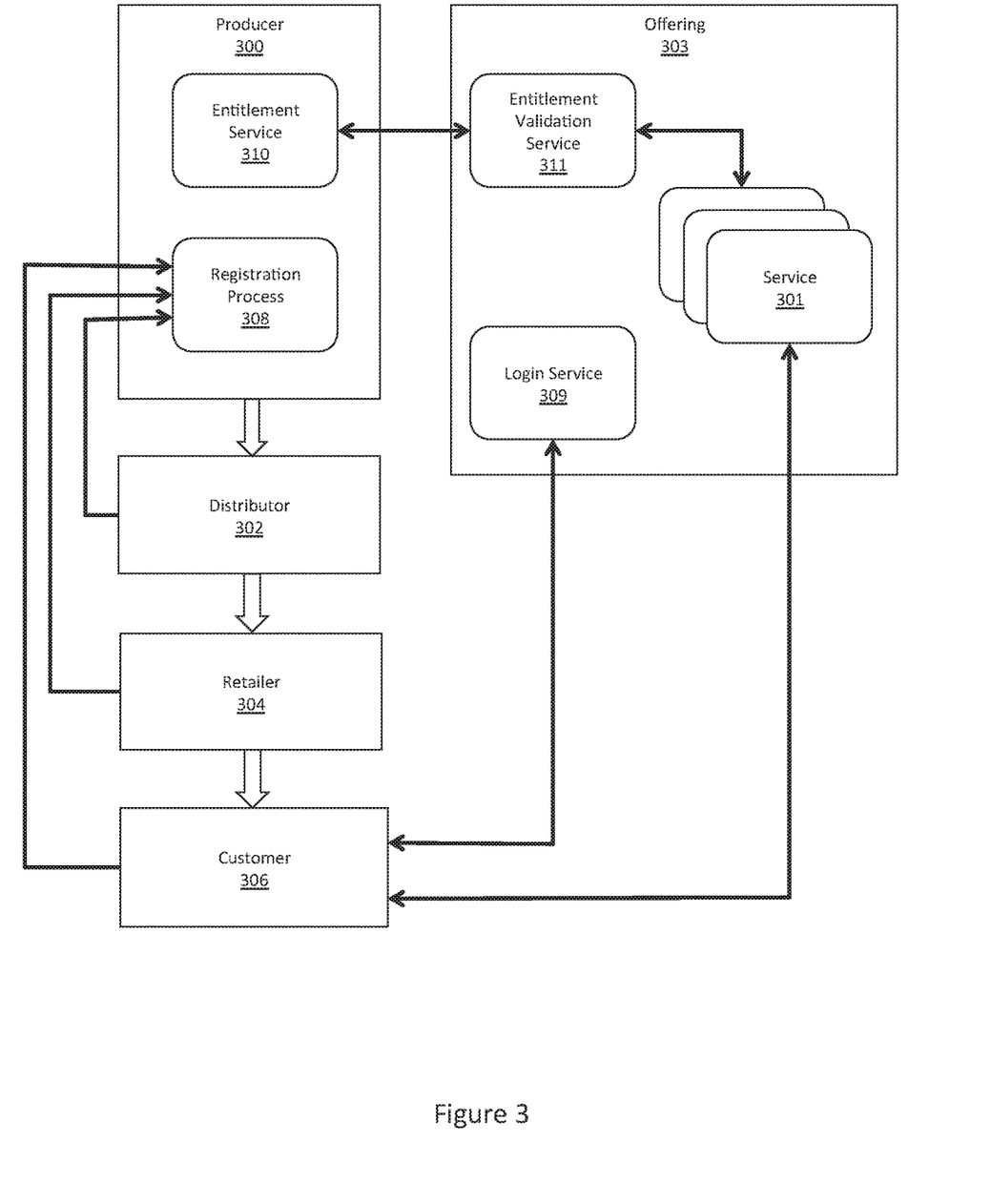
FIG. 3 illustrates a system architecture for tiered licensing consistent with an embodiment of the present disclosure.

Turning now to FIG. 3, a system architecture for tiered licensing is described. This system and the accompanying methods enable a producer to provide a service to a customer, where the service is sold through zero or more intermediaries. For example, the producer may enable a distributor to sell to a retailer, and the retailer to sell to a customer. This may be particularly beneficial when the intermediaries are channel partners who may add their own services to the service offering.

FIG. 3 depicts a two-tiered distribution network. Producer 300 may provide a service offering, such as service offering 303. Service offering 303 may define one or more services which are available to customers. Producer 300 may not, however, sell services directly to customers. Producer 300 may instead allow distributor 302 to sell to retailer vendor 304, and retail vendor 304 may thereafter sell the service to customer 306. In an embodiment, the offering exposition and/or an associated tariff may specify the number of tiers in the system. For example, the offering exposition may include a "level" attribute. The level attribute may specify the number intermediaries between the producer and the customer. For example, if level equals two, there must be two intermediaries between the producer and customer (as shown in FIG. 3). If level equals zero, in contrast, the producer must sell directly to the customer.

The resale process may be facilitated using license keys, however acceptance proxies may be a preferred alternative. For example, producer 300 may sell a block of license keys to distributor 302, who may sell a subset of those keys to retailer 304. Retailer 304 may in turn provide one or more license keys to customer 306. License keys, however, present two disadvantages to producer 300. First, once license keys are released producer 300 loses control of the intermediaries. Producer 300 may intend for a two-tiered system, but one of the intermediaries may sell the keys to an unauthorized reseller, such as another retailer. These "grey markets" may decrease demand for new services, and may negatively impact the producers ability to track them. Second, license keys are prone to piracy. If an unauthorized entity obtains a copy of the license key, they may use that key multiple times to access the associated software. The processes discussed herein help alleviate these concerns.

The architecture of FIG. 3 uses a combination of acceptance proxies and registration processes to ensure producer 300 maintains some control over the marketplace, while also protecting against piracy. As used herein, an acceptance proxy is a unique code, token, or other identifier permitting a customer to consume one or more services 301 within service offering 303. Acceptance proxies differ from license keys, however, in that acceptance proxies require additional authentication before the service may be consumed. In an embodiment, producer 300 may provide one or more acceptance proxies to distributor 302. Distributor 302, in turn, may provide one or more acceptance proxies to retailer 304, who may thereafter provide them to customer 306. A block arrow represents each of these transactions.

Before customer 306 can consume service 301, the acceptance proxy must be registered and the customer must be validated. In an embodiment, proxy registration occurs as an acceptance proxy moves through the system. For example, producer 300 may distribute an acceptance proxy to distributor 302. Since producer 300 is providing the acceptance proxy directly to distributor 302, producer 300 may automatically register distributor 302 as the first-tier reseller. Distributor 302, however, may provide the acceptance proxy to retail vendor 304. Retailer 304 may register the acceptance proxy using producer 300's registration process 308. Registration process 308 may register that the acceptance proxy has been distributed a second time using entitlement service 310. In this manner, producer 300 knows that the acceptance proxy has been distributed twice, and the next registration belongs to customer 306.

In an embodiment, entitlement service 310 may manage acceptance proxy registration information. Entitlement service 310 may, for example, store registration information in a database table or any other data structure. Entitlement service 310 may store a unique identifier for each acceptance proxy, a level number associated with the acceptance proxy, the number of times the acceptance proxy has been registered, an identifier associated with the registrant, whether the acceptance proxy is activated, and whether escrow is satisfied (if applicable, as discussed below). For example, Table 1 depicts a populated database table managed by entitlement service 310.

TABLE 1

| Acceptance Proxy ID | Level | Times Registered | Registrant | Activated | Escrow Satisfied |
|---|---|---|---|---|---|
| 101 | 2 | 1 | Vendor1 | false | n/a |
| 101 | 2 | 2 | Vendor2 | false | n/a |
| 101 | 2 | 3 | Customer1 | true | n/a |
| 102 | 1 | 1 | Vendor4 | false | false |
| 102 | 1 | 2 | Customer2 | true | true |
| 103 | 0 | 1 | Customer3 | true | n/a |
| 104 | 1 | 1 | Vendor5 | false | n/a |
| 104 | 1 | 2 | Customer4 | true | n/a |

As shown in Table 1, acceptance proxy 101 is for a two-tiered system and has been registered three times. The first time is to Vendor1, which may be distributor 302, the second time is to Vendor2, which may be retailer 304, and the final time is to Customer1, which may be customer 306. While the Registrant column in Table shows the individual vendors, this information may be anonymous as discussed in reference to FIG. 4. In some embodiments, the Registrant column may cross reference another database table that contains Registrant details (e.g. name, address, contact information, etc). Table 1 also shows in the Level column that acceptance proxy 101 is marked for two tiers of distribution. The Activated column notes whether the acceptance proxy has been activated. In an embodiment, activating the acceptance policy requires a customer to access the service using the proxy. Finally, the escrow column specifies whether escrow has been satisfied.

Acceptance proxies may control distribution for any number of tiers, or no tiers. For example, acceptance proxy 103 represents a sale straight from a producer to a customer (i.e. Customer3). This direct sale does not involve a tiered distribution, and the level is therefore 0. Similarly, acceptance proxy 104 represents a single tier of distribution. The level for proxy 104 is therefore 1. A producer may distribute the acceptance proxy to Vendor5, who may in turn transfer the acceptance proxy to Customer4.

Turning back to FIG. 3, once customer 306 has received an acceptance proxy he may register and activate it using registration process 308. Registration process 308 may access entitlement service 310, verify the acceptance proxy has been registered a number of times equal to its level, and register customer 306 as the final registrant. Entitlement service 310 may also update the acceptance policy's activation status to "true" to denote that the service may be consumed using that acceptance policy.

Once customer 306 has registered their acceptance proxy with producer registration process 308, customer 306 may attempt to access service 301. Customer 306 may first provide login credentials to login service 309 for validation. These login credentials could be, for example, a username/password and the acceptance proxy. Customer 306 may then access one or more services 301 for consumption in accordance with the offering exposition. Service 301 may validate the customer using entitlement validation service 311, which may query entitlement service 310 to ensure the acceptance proxy is activated. If the acceptance policy has been activated, service 301 may be provided to customer 306. If the acceptance policy is not activated, access to the service may be denied until the acceptance proxy is activated and/or the times-registered equals the proxy's level.

In some embodiments, entitlement validation service 311 may perform further authentication by comparing a customer identifier with the Registrant column. For example, Customer 306 may provide a customer identifier when accessing service 301. During the validation process, entitlement validation service 311 may check that the acceptance proxy is associated with the customer identifier when verifying the acceptance proxy is activated. If the acceptance proxy is associated with some other entity, access to the service may be denied. This may prevent unauthorized access by some third party, and unauthorized acceptance proxy resale by the customer.

The architecture of FIG. 3 may also allow producers to confidently distribute their offerings through copying software, such as bittorrent. Users may believe they are receiving "free" copies of the software, when in reality they must register it before use. This is different than software that merely relies on license keys, because once a license key is stolen the software may be used without further authentication.

Figure 4:
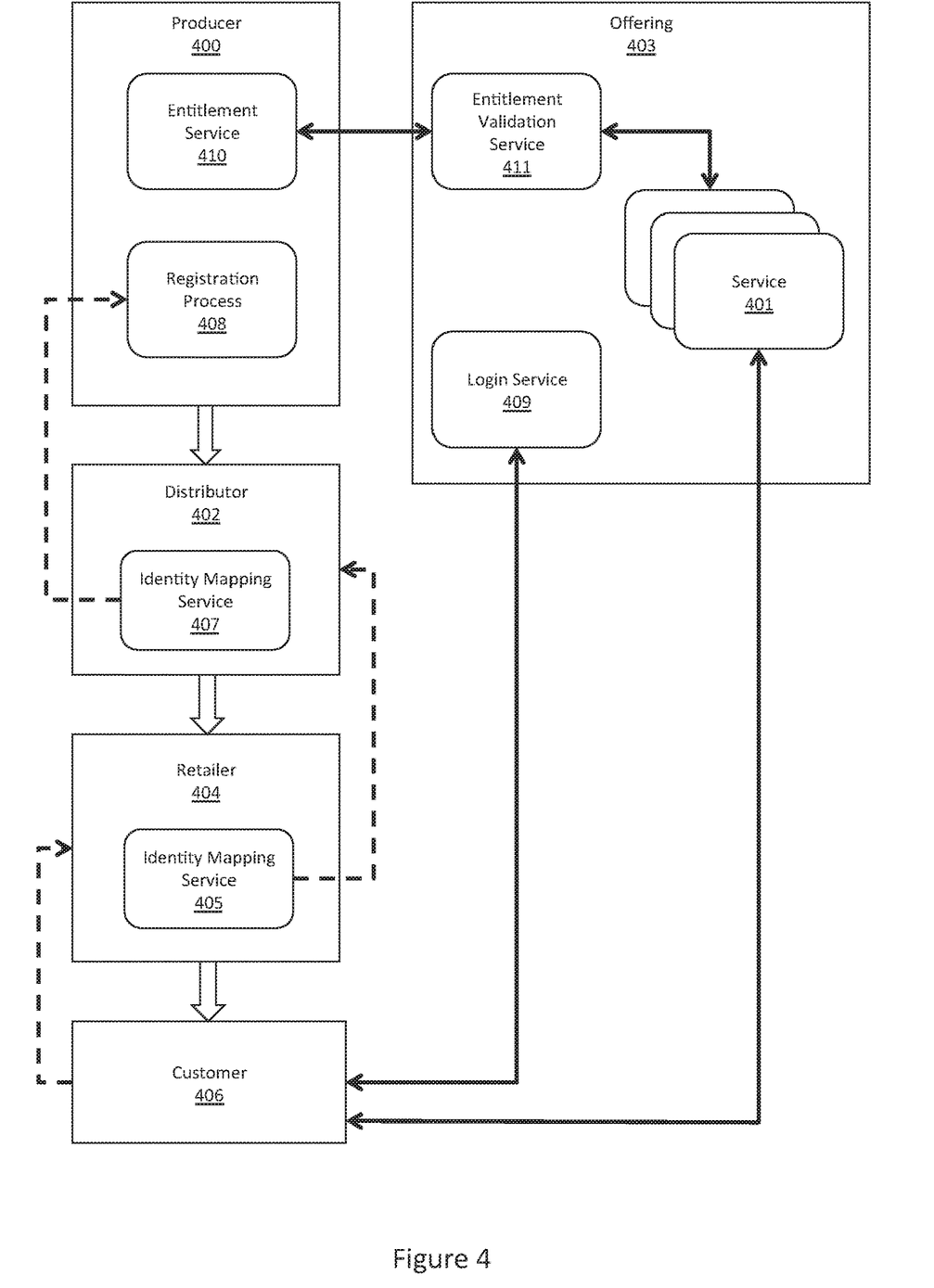
FIG. 4 illustrates a system architecture for providing anonymous registrations consistent with an embodiment of the present disclosure.

With reference to FIG. 4, an architecture and process for enabling tiered distribution using anonymous registrations is discussed. The process of FIG. 3 may enable multi-tiered distribution, but it may also require each tier to register directly with the producer. Vendors may prefer to keep their customer's identification confidential, and therefore be reluctant to allow this registration. For example, they may not want the producer to know customer identities because the producer may thereafter target the customers directly and remove the middleman. The anonymous registrations shown in FIG. 4 may enable tiered distribution, without disclosing specific identities.

The system of FIG. 4 includes producer 400, distributor 402, retailer 404, customer 406, and offering 403. Producer 400 includes registration process 408 and entitlement service 410. These elements may be substantially similar to registration process 308 and entitlement service 310. Offering 403 may include entitlement validation service 411, service 401, and login service 409, which may be substantially similar to the elements discussed in reference to FIG. 3. Unlike FIG. 3, however, distributor 402 includes identity mapping service 407, and retailer 404 includes identity mapping service 405. These identity mapping services may limit the information flowing to producer 400, while still permitting multi-tiered licensing.

The architecture shown in FIG. 4 permits each downstream acceptance proxy recipient to register that proxy with its immediate predecessor. For example, distributor 402 may register acceptance proxies directly with producer 400 via registration process 408. Alternatively, since distributor 400 is known to producer 400, producer 400 may register the acceptance proxies automatically. Retailer 404, however, may register its acceptance proxies with distributor 402. Distributor 402 may map retailer 404's identity to an anonymized identifier, and then register the anonymous identifier with registration process 408. When registration process 408 sends the registrant information to entitlement service 410, the associated data structure may be updated as if the anonymous identifier clearly identified the registrant. For example, the Registrant column in Table 1 may be updated to include the anonymous information. This may allow producer 400 to track the distribution of the acceptance proxy, without actually identifying who holds the proxy.

Similar to retailer 404, customer 406 may register its acceptance proxy with its immediate predecessor. Retailer 404 may map customer 406's identity to an anonymous identifier using identify mapping service 405, and register the proxy with distributor 402. Distributor 402 may in turn register the acceptance proxy with registration process 408 using the customer's anonymous identifier.

While FIG. 3 and FIG. 4 show acceptance proxy recipients registering the proxies themselves, in some embodiments the registration process may be performed by the predecessor on the recipient's behalf. For example, in FIG. 4 producer 400 may register the acceptance proxy on wholesale distributor 402's behalf. Similarly, when distributor 402 distributes the acceptance proxy to retailer 404, distributor 402 may register the acceptance proxy on retailer 404's behalf. This process may build market confidence by allowing predecessors to warrant to downstream recipients that the acceptance proxies are valid and have been registered.

In some embodiments, a hybrid of the systems of FIG. 3 and FIG. 4 may be used. For example, any one of the resellers in the distribution chain may know the identity of the downstream recipients, while its predecessors do not. This could be beneficial, for example, if one of the resellers is a franchisor. The franchisor may wish to monitor where the franchisees are distributing acceptance proxies, but may wish to keep this information anonymous from a producer, wholesaler, or other predecessor. In such an embodiment, all the downstream recipients may register the proxy directly with the franchisor, who may thereafter anonymize them and register with the producer.

Figure 5:
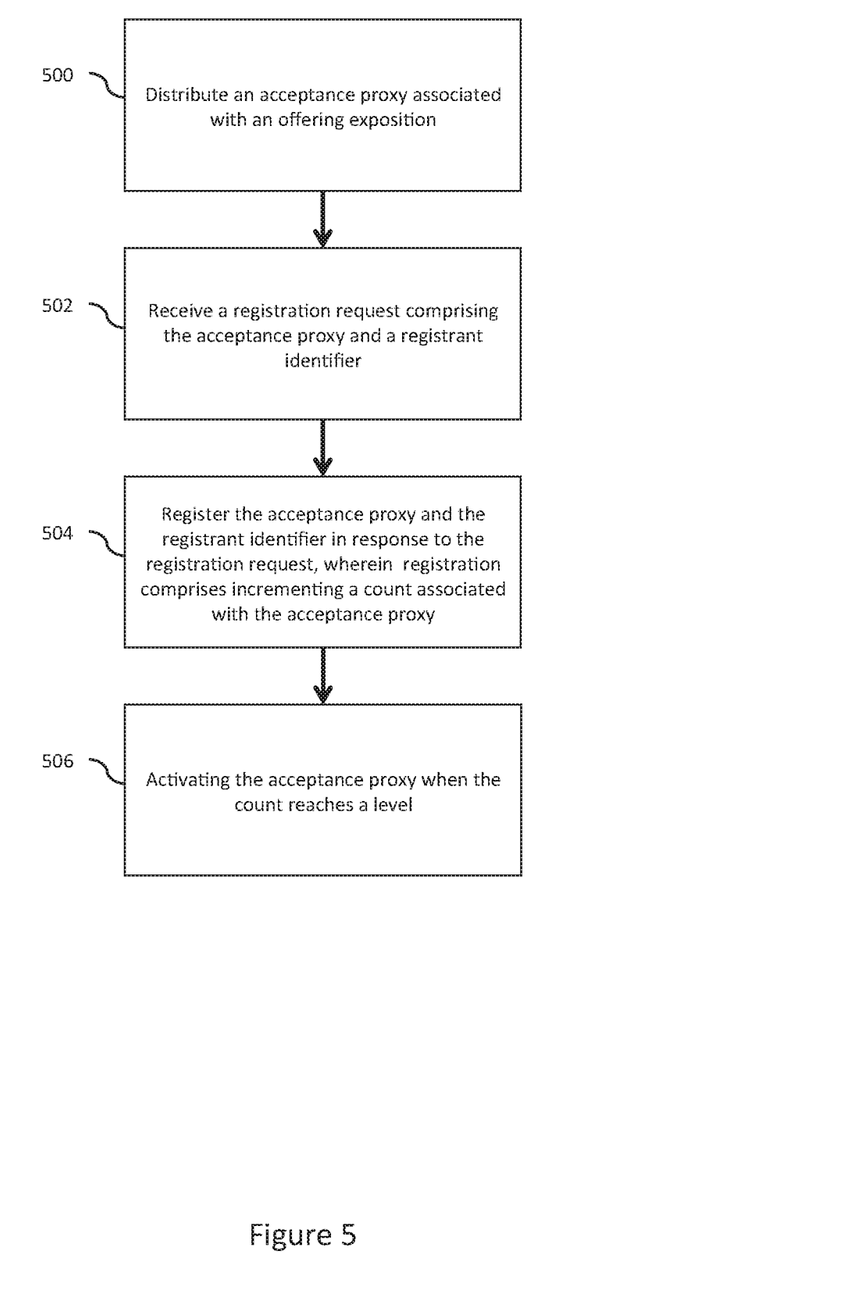
FIG. 5 illustrates a flowchart for registering acceptance proxies consistent with an embodiment of the present disclosure.

Turning now to FIG. 5, a flowchart for registering acceptance proxies is discussed. At block 500, an acceptance proxy associated with an offering exposition is distributed. This offering exposition may comprise a service, as discussed in reference to FIG. 2.

At 502 a registration request comprising an acceptance proxy and a registrant identifier may be received. The registration request could be received, for example, at retailer 404, distributor 402, and/or producer 400. In some embodiments, the registrant identifier may identify a reseller, such as a wholesaler, retailer, vendor, customer, or any other entity capable of consuming a service or distributing an acceptance proxy. Additionally or alternatively, the registrant identifier may be anonymous, as discussed in detail below.

At 504, the acceptance proxy and registrant identifier may be registered in response to the registration request. For example, they may be registered using entitlement service 310 or 410. Registering this information may comprise updating a database table, such as Table 1. For example, the acceptance proxy may be stored in the Acceptance Proxy ID column and the registrant identifier may be stored in the Registrant column. Registering the request may further comprise updating a count associated with the acceptance proxy. For example, the count may be stored in the Times Registered column of Table 1. This update may be performed, for example, using producer entitlement service 310 or 410.

At block 506, the acceptance proxy is activated when the count reaches a level. This activation could involve, for example, noting that the acceptance proxy is activated using an "Activated" column as discussed in reference to Table 1.

Figure 6:
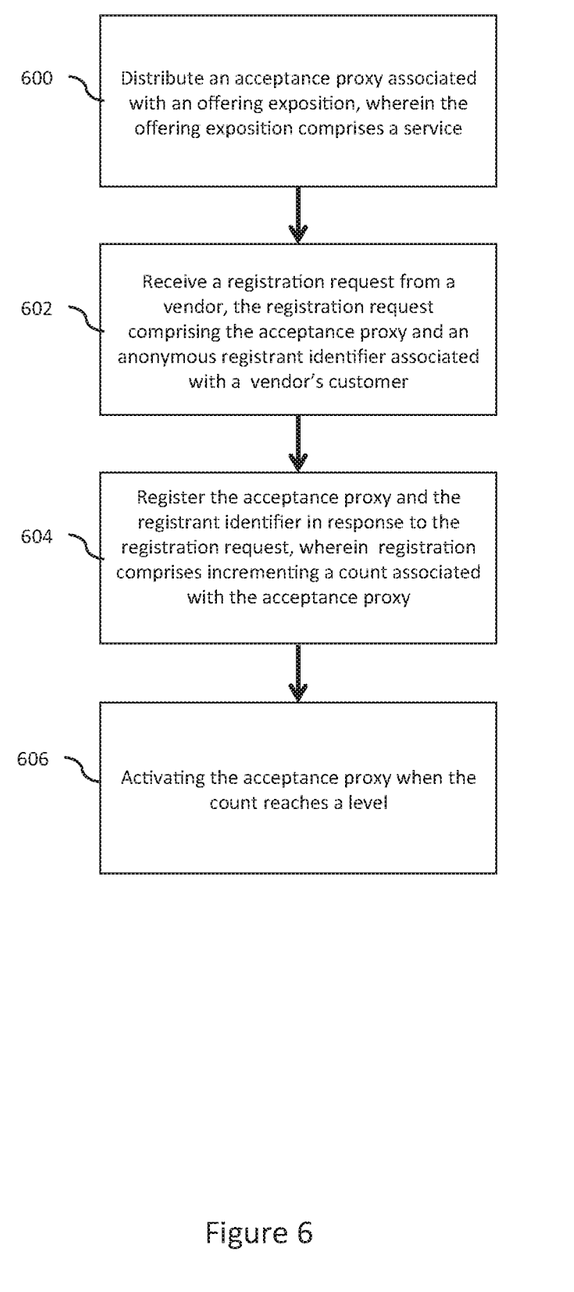
FIG. 6 illustrate flowchart for registering acceptance proxies using anonymous identifiers consistent with an embodiment of the present disclosure.

With reference to FIG. 6, a flow chart for receiving and registering anonymous registrant identifiers is discussed. At block 600 an acceptance proxy associated with a service offering may be distributed. This service offering may comprise a service, and be substantially similar to the offering discussed above.

At block 602, a registration request may be received from a vendor. The registration request may comprise an acceptance proxy and an anonymous customer identifier associated with the vendor's customer. For example, producer 400 may receive an anonymous identifier from wholesale vendor 402, where the anonymous identifier is associated with retail vendor 404.

At block 604, the acceptance proxy an anonymous registrant identifier may be registered. This registration process could, for example, updating a data structure managed by entitlement service 410.

At block 606, the acceptance proxy may be activated when a count reaches a specified level. This activation may be substantially similar to that discussed in reference to FIG. 5 and Table 1.

Figure 7:
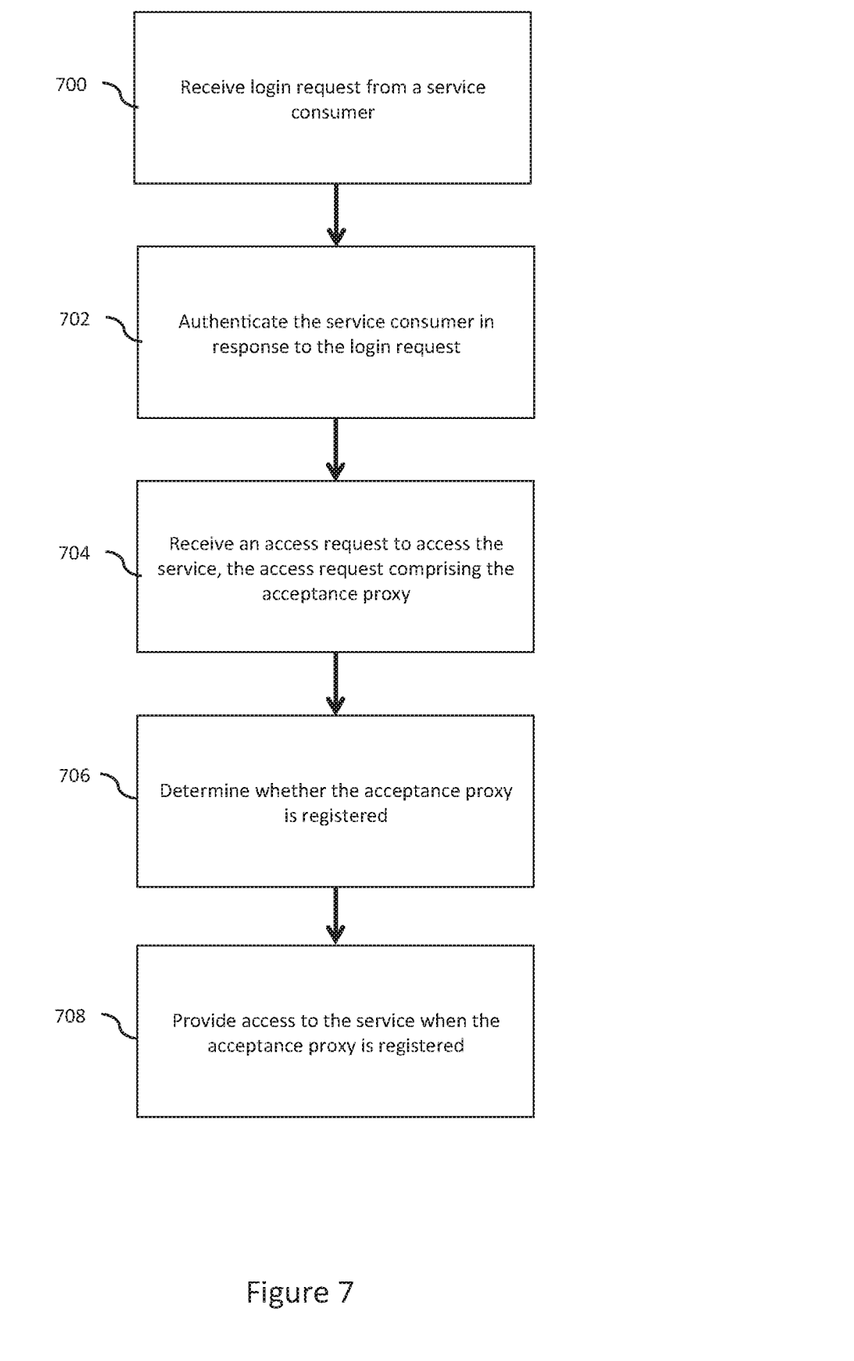
FIG. 7 depicts a flowchart for accessing a service using an acceptance proxy consistent with an embodiment of the present disclosure.

Turning now to FIG. 7, a flowchart for granting access to a service is discussed. At 700 a login request may be received from a service consumer. This service consumer may be similar to customer 306 and/or customer 406, and the login request may be received at login service 309 and/or 409.

At block 702, the service consumer may be authenticated in response to the login request. This could be accomplished, for example, by verifying a user name and password combination.

At 704, a request to access a service may be received. The service may be, for example, service 301 or 401, and the request may come from a service consumer, such as customer 306 or 406. The access request may comprise the acceptance proxy associated with a given service, customer login credentials, and/or a customer identifier.

At block 706, a check may be made to determine whether the designated level has been reached. This check could be made, for example, using entitlement validation service 311 and/or 411. In an embodiment, the count may be defined in the offering exposition and/or tariff, and may designate the number of authorized intermediaries between the producer and the final customer. For example, a check of Table 1 may determine whether the Times Registered column equals the Level column plus one. Additionally or alternatively, the check may only evaluate the Activated column with the understanding that the column will only be true if the count exceeds the level.

In some embodiments, the check at 706 may also verify the service consumer is last registrant associated with the acceptance proxy. In other words, the check may determine the service consumer is the party authorized to consume the service. This may be accomplished by comparing a registrant identifier or anonymous identifier provided by the consumer with the value in the Registrant column. If the Registrant value for an activated acceptance proxy matches the provided identifier, the service consumer is authorized to consume the service. This may provide an additional level of security beyond user authentication.

Finally, at block 708 access to the service may be provided to the customer when the acceptance proxy is activated.

In some embodiment, the login request and the access request may be received contemporaneously, or may be the same request. For example, a single access request may be received comprising login information for login service 309 and/or 409, and an acceptance proxy and identifier for service 301.

Figure 8:
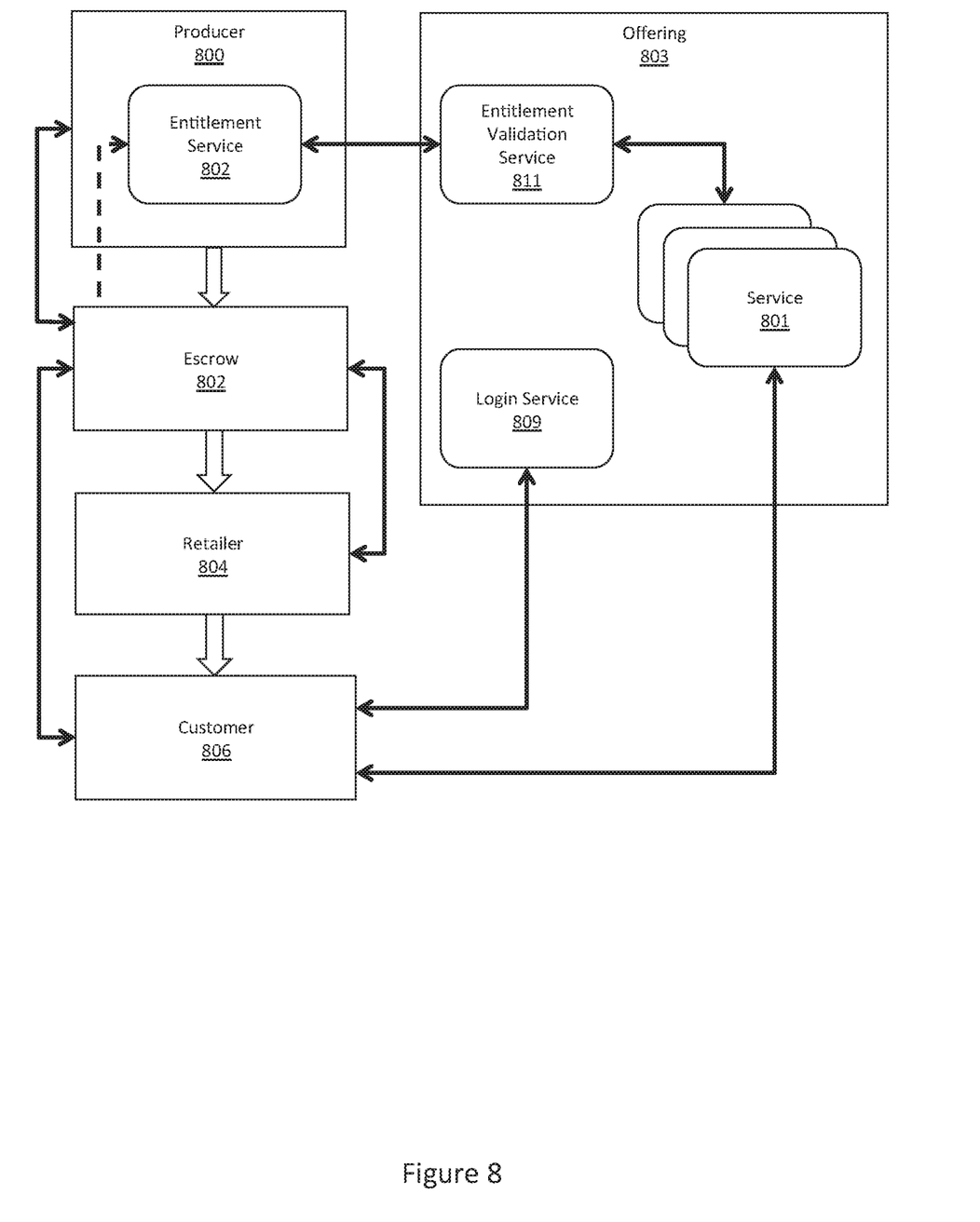
FIG. 8 depicts a system architecture for providing escrow services consistent with an embodiment of the present disclosure.

Turning now to FIG. 8, a system architecture and process for providing an escrow service is discussed. FIG. 8 includes producer 800, offering 803, retailer 804, and customer 806. Offering 803 may include service 801, login service 809, and entitlement validation service 811. These elements may be substantially similar to those discussed above, and in an embodiment may enable acceptance proxy registration for both known and anonymous registrants.

FIG. 8 also includes escrow 802. Escrow 802 may perform as any other intermediary, and may also provide escrow services. Escrow services may allow the parties to conduct business with the confidence that access to the service will not be provided until each parties' contractual obligations are satisfied.

Escrow 802 may be in communication with each of the contracting parties. This communication is show by the black, bidirectional arrows. Notifications may be sent to escrow 802 as each party satisfies its contractual obligations. For example, retailer 804 may notify escrow 802 when customer 806 pays retailer 804 for the acceptance proxies. Similarly, customer 806 may notify escrow 802 when customer 806 receives the acceptance proxies. Once each party has notified escrow 802 that the contractual obligations owed to it are satisfied, escrow 802 may notify entitlement service 810 that escrow is satisfied an service may be provided (assuming the proxy is activated).

With reference to both FIG. 8 and Table 1, acceptance proxy ID 102 provides an example of an acceptance proxy distributed in an escrow environment. The acceptance proxy has a Level of 1, meaning it is intended for a single distribution tier. The acceptance proxy was registered a first time to Vendor 4, and the Activated column is "false" since the Times Registered equals the level. The Escrow Satisfied column is also "false," meaning escrow 802 has not yet notified entitlement service 810 that escrow has been satisfied.

Proxy ID 102, however, is also registered to Customer 2. This entry notes that the proxy is activated, and escrow is satisfied. When the customer attempts to access service 801 using the acceptance proxy, entitlement validation service 811 will check entitlement service 810 to confirm the proxy is activated and escrow is satisfied. The customer will then be able to access the service.

The terms vendor, wholesaler, producer, and customer used herein may refer to general purpose computer systems owned by an organization or individual. They are not, necessarily, the organization or individual themselves. Additionally, the terms sell or distribute may mean an electronic data transmission. For example, "selling" acceptance proxies may involve transmitting them from one general-purpose computer to another over a physical network connection.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for multi-tiered service licensing, the method comprising:

distributing, by one or more processors, an acceptance proxy associated with an offering exposition to one or more nodes over a network, wherein the offering exposition comprises a service that is provided by a producer, and the acceptance proxy is a unique code or token;

receiving, by the one or more processors, a registration request comprising the acceptance proxy and a registrant identifier, wherein the registration request is received via the network;

registering, by the one or more processors, the acceptance proxy and the registrant identifier with the producer in response to the registration request;

determining, by the one or more processors, based at least in part on a number of times the acceptance proxy has been registered with the producer and a number of tiers in a corresponding distribution network associated with licensing the service, whether to activate the acceptance proxy, comprising:

obtaining a level attribute associated with the acceptance proxy from a database, wherein the level attribute is indicative of a number of times the acceptance proxy is to be registered before the acceptance proxy is to be activated;

obtaining the number of times the acceptance proxy has been registered with the producer from the database;

determining whether the number of times the acceptance proxy has been registered with the producer corresponds to the level attribute; and in response to determining that the number of times the acceptance proxy has been registered with the producer corresponds to the level attribute, determining that the acceptance proxy is to be activated;

receiving, by the one or more processors, an access request to access the service, the access request comprising the acceptance proxy; and providing, by the one or more processors, access to the service based at least in part on a determination that the acceptance proxy is to be activated, wherein providing access to the service comprises permitting the service to be accessed by a terminal via a network.

2. The method of claim 1, wherein the registrant identifier is anonymized.

3. The method of claim 1, wherein registering the acceptance proxy comprises incrementing a count associated with the acceptance proxy, wherein the count indicates the number of times the acceptance proxy has been registered.

4. The method of claim 3, further comprising activating the acceptance proxy when the count satisfies a requirement based at least in part on the level attribute.

5. The method of claim 4, wherein the level attribute is defined in the service offering and stored in the database.

6. The method of claim 5, wherein the level attribute specifies a number of intermediaries between a producer and a consumer.

7. The method of claim 6, wherein the intermediaries include at least one of a distributor, a retailer, and a reseller.

8. The method of claim 1, further comprising authenticating a consumer in response to the access request.

9. The method of claim 1, further comprising determining whether an escrow requirement is satisfied.

10. The method of claim 9, wherein providing access to the service further comprises providing service when both the escrow requirement is satisfied and the acceptance proxy is registered.

11. A computer program product for multi-tiered service licensing, the computer program product comprising a non-transitory computer readable medium having program instructions embodied therein for:
 distributing an acceptance proxy associated with an offering exposition to one or more nodes over a network, wherein the offering exposition comprises a service that is provided by a producer, and the acceptance proxy is a unique code or token;
 receiving a registration request comprising the acceptance proxy and a registrant identifier, wherein the registration request is received via the network;
 registering the acceptance proxy and the registrant identifier with the producer in response to the registration request;
 determining, based at least in part on a number of times the acceptance proxy has been registered with the producer, whether to activate the acceptance proxy and a number of tiers in a corresponding distribution network associated with licensing the service, comprising:
  obtaining a level attribute associated with the acceptance proxy from a database, wherein the level attribute is indicative of a number of times the acceptance proxy is to be registered before the acceptance proxy is to be activated;
  obtaining a number of times the acceptance proxy has been registered with the producer from the database;
  determining whether the number of times the acceptance proxy has been registered corresponds to the level attribute; and
  in response to determining that the number of times the acceptance proxy has been registered with the producer corresponds to the level attribute, determining that the acceptance proxy is to be activated;
 receiving an access request to access the service, the access request comprising the acceptance proxy; and
 providing access to the service based at least in part on a determination that the acceptance proxy is to be activated.

12. The computer program product of claim 11, wherein registering the acceptance proxy comprises incrementing a count associated with the acceptance proxy, wherein the count indicates the number of times the acceptance proxy has been registered.

13. The computer program product of claim 12, further comprising activating the acceptance proxy when the count satisfies a requirement based at least in part on the level attribute.

14. The computer program product of claim 13, wherein the level attribute is defined in the service offering and stored in the database.

15. The computer program product of claim 13, wherein the level attribute specifies a number of intermediaries between a producer and a customer.

16. The computer program product of claim 15, wherein the intermediaries include at least one of a distributor, a retailer, and a reseller.

17. A system for multi-tiered service licensing, the system comprising a processor configured to execute computer instructions comprising:
 distributing an acceptance proxy associated with an offering exposition to one or more nodes over a network, wherein the offering exposition comprises a service that is provided by a producer, and the acceptance proxy is a unique code or token;
 receiving a registration request comprising the acceptance proxy and a registrant identifier, wherein the registration request is received via the network;
 registering the acceptance proxy and the registrant identifier with the producer in response to the registration request;
 determining, based at least in part on a number of times the acceptance proxy has been registered with the producer, whether to activate the acceptance proxy and a number of tiers in a corresponding distribution network associated with licensing the service, comprising:
  obtaining a level attribute associated with the acceptance proxy from a database wherein the level attribute is indicative of a number of times the acceptance proxy is to be registered before the acceptance proxy is to be activated;
  obtaining a number of times the acceptance proxy has been registered with the producer from the database;
  determining whether the number of times the acceptance proxy has been registered corresponds to the level attribute; and
  in response to determining the number of times the acceptance proxy has been registered with the producer corresponds to the level attribute, determining that the acceptance proxy is to be activated;
 receiving an access request to access the service, the access request comprising the acceptance proxy; and
 providing access to the service based at least in part on a determination that the acceptance proxy is to be activated.

18. The system of claim 17, wherein registering the acceptance proxy comprises incrementing a count associated with the acceptance proxy, wherein the count indicates the number of times the acceptance proxy has been registered.

19. The system of claim 18, further comprising activating the acceptance proxy when the count satisfies a requirement based at least in part on the level attribute.

20. The system of claim 19, wherein the level attribute is defined in the service offering and stored in the database.

21. The method of claim 1, wherein the database stores mappings of an acceptance proxy identifier to a level number associated with a corresponding acceptance proxy, and wherein the level attribute associated with the acceptance proxy is obtained based on the acceptance proxy identifier corresponding to the acceptance proxy and the corresponding level number associated with the acceptance proxy.

22. The method of claim 1, wherein the level attribute is defined based on the number of tiers in the corresponding distribution network for the one or more services associated with the offering exposition.

23. The method of claim 1, wherein the offering exposition indicates the number of tiers in the multi-tiered service licensing.

24. The method of claim 1, wherein the database stores an association of identifier for a plurality of acceptance proxies with a corresponding number of times the corresponding acceptance proxy has been registered, an identifier of each registrant of the corresponding acceptance proxy, and the level attribute associated with the corresponding acceptance proxy.

25. The method of claim 21, wherein the number of tiers in the distribution network is more than one, and a first tier of the tiers in the distribution network registers the acceptance proxy with the producer on behalf of a second tier of the distribution network in a manner in which an identification of a client corresponding to the second tier is anonymized with respect to the producer.

26. The method of claim 25, the registering the acceptance proxy and the registrant identifier comprises storing a mapping of the acceptance proxy to the registrant identifier in the database.

27. The method of claim 26, wherein the registration of the acceptance proxy with the producer on behalf of the second tier of the distribution network in the manner in which the identification of the client corresponding to the second tier is anonymized with respect to the producer includes:
   a storing an identifier of producer in association with the acceptance proxy in the mapping of the acceptance proxy to the registrant identifier in place of the identification of the client corresponding to the second tier for the registration of the acceptance proxy with respect to the second tier.

28. The method of claim 1, wherein the service to which the terminal is provided access is one or more of a backup service, a recovery service, and an archive service.

\* \* \* \* \*